United States Patent
Menou et al.

(10) Patent No.: US 11,577,849 B2
(45) Date of Patent: Feb. 14, 2023

(54) AIRCRAFT NACELLE HAVING A FAN RAMP WITH ARTICULATED FLAPS

(71) Applicant: Airbus Operations SAS, Toulouse (FR)

(72) Inventors: Fabien Menou, Toulouse (FR); Julie Cazalis, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 189 days.

(21) Appl. No.: 17/181,577

(22) Filed: Feb. 22, 2021

(65) Prior Publication Data

US 2021/0284350 A1    Sep. 16, 2021

(30) Foreign Application Priority Data

Feb. 24, 2020  (FR) .................................. 2001792

(51) Int. Cl.
*B64D 33/02*        (2006.01)
*F02K 1/72*         (2006.01)
(Continued)

(52) U.S. Cl.
CPC ............. *B64D 29/02* (2013.01); *B64D 33/02* (2013.01); *F02K 1/625* (2013.01); *F02K 1/72* (2013.01);
(Continued)

(58) Field of Classification Search
CPC ... F02K 1/625; F02K 1/72; F02K 1/70; F02K 1/64; B64D 29/02; B64D 2033/0286;
(Continued)

(56) References Cited

U.S. PATENT DOCUMENTS

| 2010/0212286 A1* | 8/2010 | West ..................... F02K 1/763 |
| | | 60/226.2 |
| 2015/0108248 A1* | 4/2015 | Aten ........................ F02K 1/72 |
| | | 239/265.19 |

(Continued)

FOREIGN PATENT DOCUMENTS

| EP | 2863038 A1 * | 4/2015 | ............. F02K 1/625 |
| EP | 2863040 A1 * | 4/2015 | ............... F02K 1/70 |

(Continued)

OTHER PUBLICATIONS

French Search Report; priority document.

*Primary Examiner* — Craig Kim
(74) *Attorney, Agent, or Firm* — Greer, Burns & Crain, Ltd.

(57) ABSTRACT

A nacelle having a fan casing, a cowl that movable between an advanced position and a retracted position that opens an opening between a bypass duct and the outside, deflectors secured to the mobile cowl, wherein, in the advanced position, they are around the fan casing and wherein, in the retracted position, they are across the opening, and a fan ramp with a mounting base and flaps that are able to rotate on the mounting base between a stowed position and a deployed position. For each flap, the fan ramp has a return element that urges the flap) into the deployed position, and the deflectors have a stop in contact with the flap when the mobile cowl passes from the retracted position to the advanced position. Thus, in the advanced position, the flaps are folded back and their bulk is reduced.

5 Claims, 2 Drawing Sheets

(51) Int. Cl.
*B64D 29/02* (2006.01)
*F02K 1/62* (2006.01)

(52) U.S. Cl.
CPC .............. *B64D 2033/0286* (2013.01); *F05D 2240/129* (2013.01)

(58) Field of Classification Search
CPC ........ B64D 27/18; B64D 29/04; B64D 29/06; B64D 33/02; F05D 2240/129; F05D 2220/323; F05D 2240/14; F05D 2250/71; Y02T 50/60
See application file for complete search history.

(56) References Cited

U.S. PATENT DOCUMENTS

| | | | |
|---|---|---|---|
| 2016/0160798 | A1 | 6/2016 | Guerin et al. |
| 2016/0369743 | A1* | 12/2016 | Schrell .................. F02K 1/72 |
| 2019/0283892 | A1* | 9/2019 | Gardes .................. F02K 3/06 |
| 2020/0025141 | A1 | 1/2020 | Gardes et al. |
| 2020/0031485 | A1 | 1/2020 | Kerbler et al. |
| 2020/0102908 | A1* | 4/2020 | Kelford ................ G10K 11/168 |
| 2021/0284350 | A1* | 9/2021 | Menou .................. F02K 1/625 |

FOREIGN PATENT DOCUMENTS

| | | | | |
|---|---|---|---|---|
| EP | 3059431 | A1 * | 8/2016 | ................ F02C 3/04 |
| EP | 3244053 | A1 * | 11/2017 | ................ F02K 1/72 |
| EP | 3587784 | A1 | 1/2020 | |
| EP | 3539878 | B1 * | 7/2020 | ............ B64D 27/18 |
| EP | 3868667 | A1 * | 8/2021 | ............ B64D 29/02 |
| FR | 3059646 | A1 | 6/2018 | |
| FR | 3068080 | A1 | 12/2018 | |
| FR | 3107509 | A1 * | 8/2021 | ............ B64D 29/02 |
| WO | 2015019007 | A1 | 2/2015 | |

* cited by examiner

AIRCRAFT NACELLE HAVING A FAN RAMP WITH ARTICULATED FLAPS

CROSS-REFERENCES TO RELATED APPLICATIONS

This application claims the benefit of the French patent application No. 2001792 filed on Feb. 24, 2020, the entire disclosures of which are incorporated herein by way of reference.

FIELD OF THE INVENTION

The present invention relates to an aircraft nacelle having a fan ramp with articulated flaps, and to an aircraft having at least one such nacelle.

BACKGROUND OF THE INVENTION

FIG. 4 shows a nacelle 400 of an aircraft of the prior art, in particular, a nacelle 400 for a turbofan. Such a nacelle 400 surrounds the engine, shown here by its engine casing 402 and the nacelle 400 delimits, with the engine casing 402, a bypass duct 404 in which a flow of air 406 flows from the front towards the rear.

The bypass duct 404 is located at the rear of a fan that drives the flow of air 406 and is located inside a fan casing 408 that takes the general shape of a cylinder and is fastened to a fixed structure of the nacelle 400.

The nacelle 400 also has a fixed cowl 410 that is secured to the fixed structure, and a mobile cowl 412 that is mounted so as to be able to move in translation on the fixed structure. The fixed cowl 410 and the mobile cowl 412 take the general shape of cylinders. The fixed cowl 410 is around the fan casing 408.

The mobile cowl 412 is able to move between an advanced position in which the mobile cowl 412 extends the fixed cowl 410 at the rear thereof, and a retracted position in which the mobile cowl 412 is moved away from the fixed cowl 410 so as to open between them an opening 414 that establishes the fluidic communication between the bypass duct 404 and the outside of the nacelle 400.

The turbofan also has reversal doors 416, each one being able to move between a stowed position in which it does not obstruct the bypass duct 404 and a deployed position (FIG. 4) in which it obstructs the bypass duct 404 so as to direct the flow of air 406 towards the opening 414 and thus ensure thrust reversal of the turbofan.

In order to best guide the flow of air 406 into the opening 414 and towards the outside, deflectors 418 are disposed across the opening 414.

In order to guide the flow of air 406 towards the deflectors 418, the nacelle 400 has a fan ramp 420, which is an aerodynamic structure fastened to the fan casing 408 just upstream of the opening 414. The fan ramp 420 has a domed zone 422 that is fastened to the rear of the fan casing 408 and oriented towards the opening 414, and a straight zone 424 that is fastened to the rear of the domed zone 422 and oriented generally radially just in front of the deflectors 418.

Although this installation gives good results, the particular shape of the fan ramp 420, and, in particular, the presence of the straight zone 424, makes it necessary to increase the diameter of the nacelle 400 so as to encompass the fan ramp 420, and this can cause significant drag in flight.

SUMMARY OF THE INVENTION

An aim of the present invention is to propose a nacelle with a fan ramp equipped with articulated flaps that are stowed when the rear cowl is advanced and makes it possible to reduce the thickness of the aerodynamic lines.

To that end, there is proposed a nacelle for an aircraft, the nacelle having:
- a fan casing delimiting a bypass duct,
- a fixed cowl disposed around the fan casing,
- a mobile cowl that is able to move between an advanced position in which the mobile cowl extends the fixed cowl at the rear and a retracted position in which the mobile cowl is moved away from the fixed cowl so as to open between them an opening that establishes the fluidic communication between the bypass duct and the outside of the nacelle,
- deflectors secured to the mobile cowl, wherein, in the advanced position, the deflectors are around the fan casing and wherein, in the retracted position, the deflectors are disposed across the opening, and
- a fan ramp having a mounting base and flaps, wherein the mounting base takes the form of a ring fastened to the rear of the fan casing, and wherein each flap has a downstream edge and an upstream edge opposite the downstream edge, and is able to rotate on the mounting base between a stowed position in which the upstream edge then projects towards the front of the nacelle and a deployed position in which the upstream edge then projects towards the outside of the nacelle through the opening and upstream of the deflectors in the retracted position, wherein, for each flap, the fan ramp has a return element that urges the flap into the deployed position, and wherein, for each flap, the deflectors have a stop that comes into contact with the rear of the flap when the mobile cowl passes from the retracted position to the advanced position.

Thus, in the advanced position, the flaps are folded back and their bulk is reduced.

Advantageously, each flap is fastened to the mounting base by way of two articulations.

Advantageously, each articulation is made up of a clevis secured to the flap, a tang secured to the mounting base and a pin passing through the clevis and the tang.

Advantageously, each return element is a torsion spring fitted onto the pin, of which one of the ends is urged against the flap and of which another end is urged against the mounting base.

The invention also proposes an aircraft having an engine and a nacelle according to one of the preceding variants, wherein the engine is surrounded by the nacelle.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
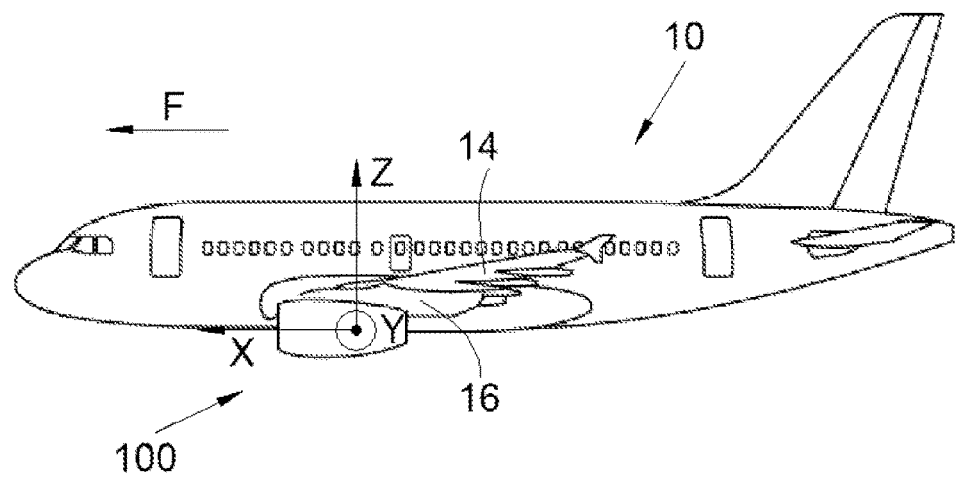
FIG. 1 is a side view of an aircraft having a nacelle according to the invention.

FIG. 1 shows an aircraft 10 having a nacelle 100 that is supported by a pylon 16 fastened beneath a wing 14.

In the following description, terms relating to a position are considered in relation to an aircraft in a position of forward movement, i.e., as shown in FIG. 1 in which the arrow F shows the direction of forward movement of the aircraft 10.

In the following description, and by convention, X denotes the longitudinal axis of the nacelle 100, which is parallel to the longitudinal axis of the aircraft 10, with positive orientation in the direction of forward movement of the aircraft 10, Y denotes the transverse axis of the nacelle 100, which is horizontal when the aircraft 10 is on the ground, and Z denotes the vertical axis or vertical height when the aircraft 10 is on the ground, these three directions X, Y and Z being mutually orthogonal.

Figure 2:
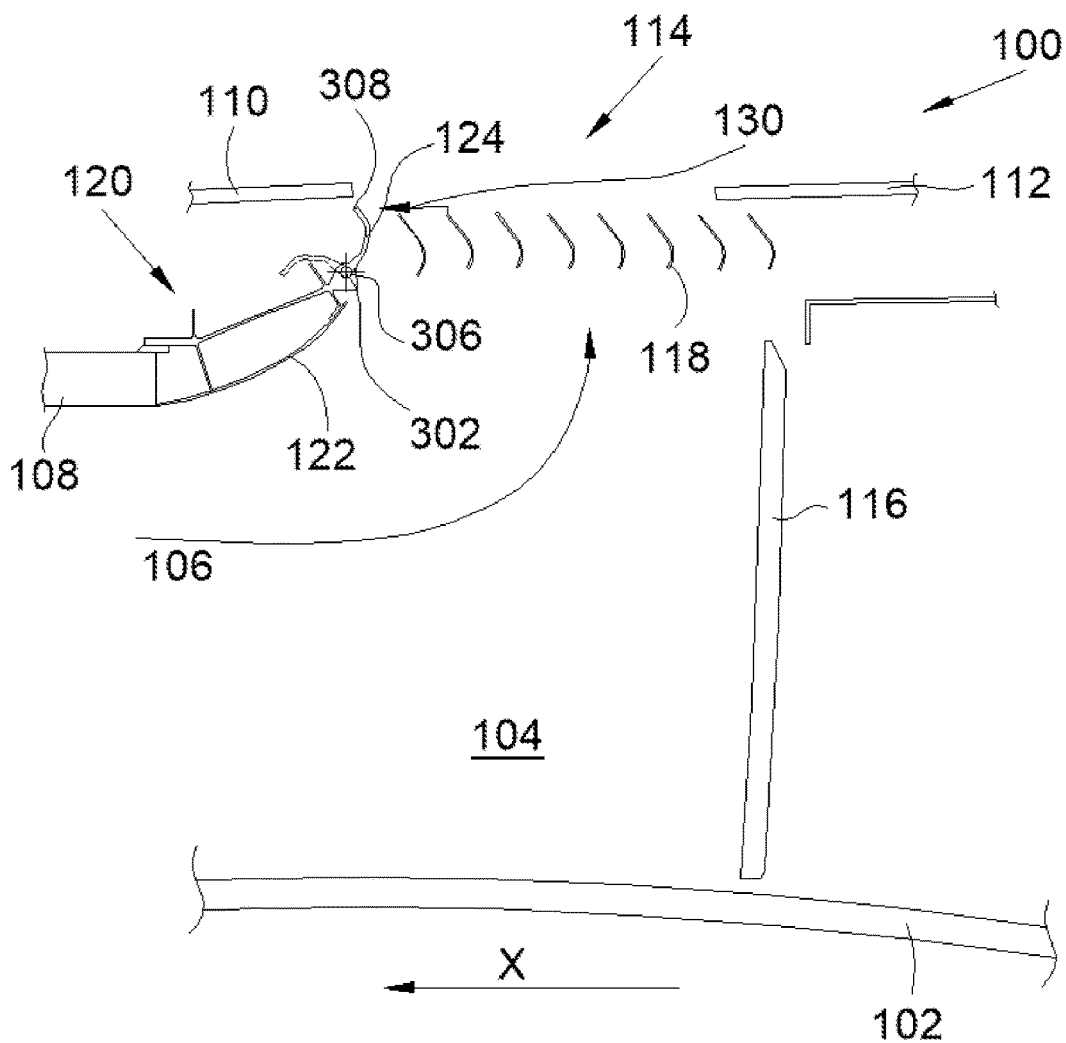
FIG. 2 is a schematic representation in section through an axial plane of a nacelle according to the invention.

FIG. 2 shows an axial cross section of the nacelle 100 according to the invention, which is similar to the nacelle 400 of the prior art except with regard to the fan ramp 420.

The nacelle 100 is implemented in the context of a turbofan and it surrounds an engine shown here by its engine casing 102.

The turbofan has a fan that drives a flow of air from the front towards the rear and is surrounded by a fan casing 108 that is fastened to a fixed structure of the nacelle 100 around the engine casing 102.

The fan casing 108 and the engine casing 102 delimit between them a bypass duct 104 in which the flow of air 106 flows.

The nacelle 100 also has a fixed cowl 110 that is secured to the fixed structure, and a mobile cowl 112 that is mounted so as to be able to move in translation on the fixed structure. In the embodiment of the invention that is presented here, the fixed cowl 110 is around the fan casing 108.

The bypass duct 104 is extended at the rear of the fan casing 108 between the cowls 110 and 112 and the engine casing 102.

The mobile cowl 112 is able to move between an advanced position in which the mobile cowl 112 extends the fixed cowl 110 at the rear thereof, and a retracted position in which the mobile cowl 112 is moved away from the fixed cowl 110 towards the rear so as to open between them an opening 114 that establishes the fluidic communication between the bypass duct 104 and the outside of the nacelle 100. As is the case for the prior art, the mobile cowl 112 is made to move by any appropriate means known to these skilled in the art, such as, for example, sliders, actuators, motors, etc.

The turbofan also has reversal doors 116, each one being able to move between a stowed position in which it does not obstruct the bypass duct 104 and a deployed position (FIG. 2) in which it obstructs the bypass duct 104 so as to direct the flow of air 106 towards the opening 114 and then the outside, and thus ensure thrust reversal of the turbofan. As is the case for the prior art, the reversal doors 116 are made to move by any appropriate means known to these skilled in the art, such as, for example, sliders, actuators, motors, etc.

The nacelle 100 has deflectors 118 (also called "cascades") that are able to move in translation with the mobile cowl 112, wherein, in the advanced position, the deflectors 118 are positioned around the fan casing 108, between the fan casing 108 and the fixed cowl 110, and wherein, in the retracted position, the deflectors 118 are disposed across the opening 114, so as to best guide the flow of air 106 into the opening 114 and towards the outside.

In order to guide the flow of air 106 towards the opening 114 and the deflectors 118, the nacelle 100 has a fan ramp 120 that has a mounting base 122 and flaps 124 and is disposed just upstream of the opening 114 and just upstream of the deflectors 118 when they are in the retracted position.

The mounting base 122 takes the form of a ring that is fastened to the rear of the fan casing 108 and in this case has a domed shape oriented towards the opening 114 and the bypass duct 104. This mounting base 122 makes it possible to widen the bypass duct 104 towards the opening 114. Of course, the mounting base 122 can be an integral part of the fan casing 108.

Figure 3:
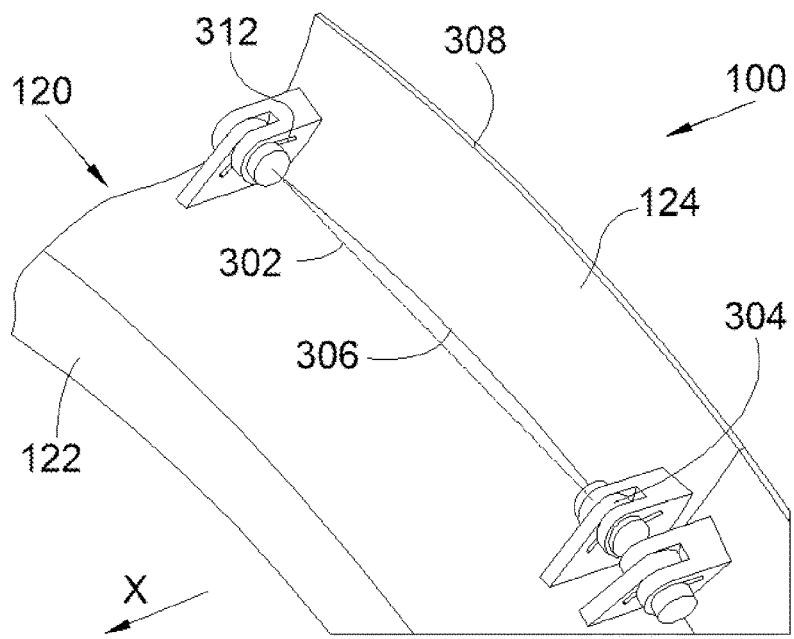
FIG. 3 is a perspective view of a fan ramp according to the invention.
Figure 4:
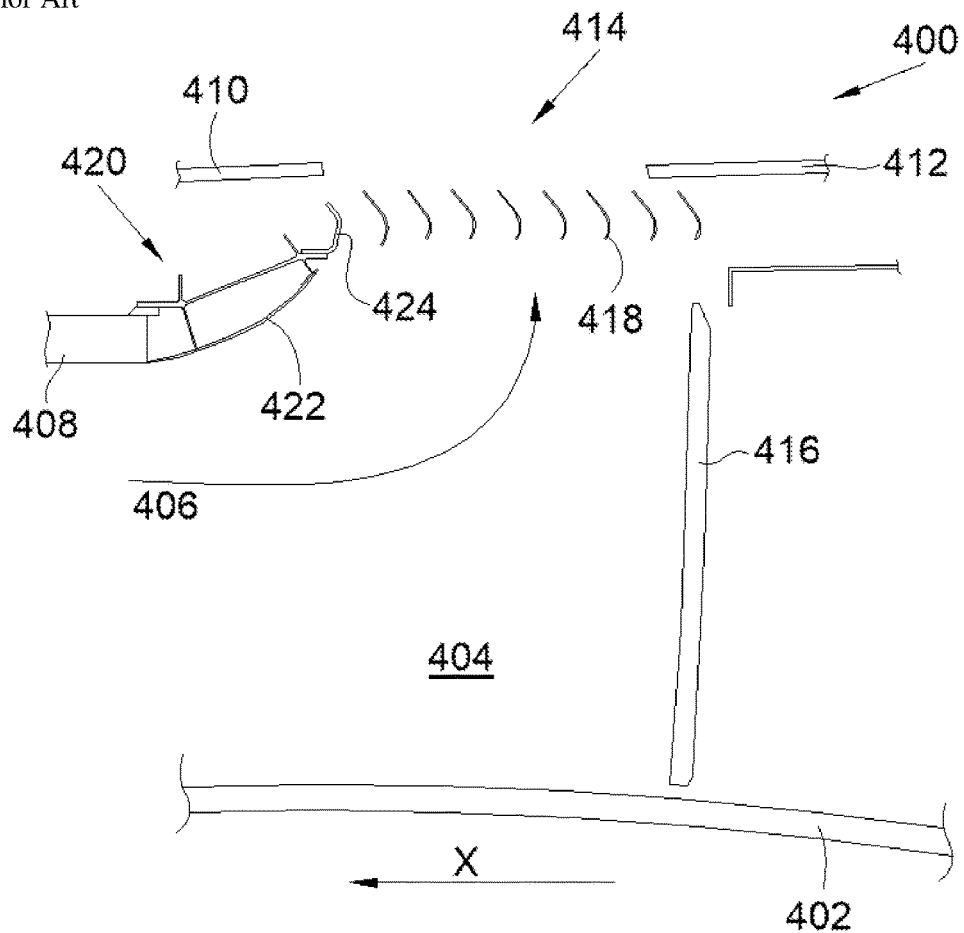
FIG. 4 is a schematic representation in section through an axial plane of a nacelle of the prior art.

As FIG. 3 shows, a plurality of flaps 124 are mounted so as to be able to rotate on the mounting base 122 about an axis of rotation 302 generally tangential to the mounting base 122.

In this case, each flap 124 is mounted so as to be articulated on the mounting base 122 by way of two articulations 304.

The flaps 124 are disposed one after another around the mounting base 122, and the number of flaps 124 and the angular extent of each flap 124 depend, inter alia, on the diameter of the mounting base 122.

Each flap 124 has a downstream edge 306 that is able to rotate on the mounting base 122, and an upstream edge 308 that is the edge opposite the downstream edge 306 and is therefore the free edge of the flap 124.

Each flap 124 is able to move between a stowed position and a deployed position.

In the stowed position, the flap 124 is folded down towards the mounting base 122, in this case towards the outer surface of the mounting base 122. This stowed position is shown in dash-dotted line in FIG. 2. The upstream edge 308 then projects towards the front of the nacelle 100. The stowed position allows the deflectors 118 to pass around the flaps 124.

In the deployed position, the flap 124 is generally oriented in a plane perpendicular to the longitudinal axis X, and it is therefore lifted off the mounting base 122. This deployed position is shown in unbroken line in FIG. 2. The upstream edge 308 then projects towards the outside of the nacelle 100, through the opening 114, and the flap 124 then takes the place of the straight zone 424 of the prior art. Passage from the deployed position to the stowed position is brought about by rotation of the flap 124 towards the front of the nacelle 100.

For each flap 124, the fan ramp 120 also has a return element 312 that urges the flap 124 into the deployed position.

For each flap 124, the deflectors 118 have a stop 130 that comes into contact with the rear of each flap 124 and pushes each of them back towards its stowed position, when the mobile cowl 112 passes from the retracted position to the advanced position.

Thus, by putting in place stowable flaps 124, the diameter of the nacelle 100, i.e., of the fixed cowl 110 and of the mobile cowl 112, is reduced, at the same time reducing the thickness of the aerodynamic lines while maintaining the guiding of the flow of air 106 towards the outside in the retracted position.

In this case, each articulation 304 is made up of a clevis secured to the flap 124, a tang secured to the mounting base 122 and a pin passing through the clevis and the tang.

Each return element 312 is, for example, a torsion spring that is fitted onto the pin, of which one of the ends is urged against the flap 124 and of which another end is urged against the mounting base 122. In this case, there is one return element 312 per articulation 304.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for an aircraft, said nacelle comprising:
 a fan casing delimiting a bypass duct,
 a fixed cowl disposed around the fan casing,
 a mobile cowl movable between an advanced position in which the mobile cowl extends the fixed cowl at a rear end and a retracted position in which the mobile cowl is moved away from the fixed cowl, to open between them an opening that establishes a fluidic communication between the bypass duct and an outside of the nacelle,
 deflectors secured to the mobile cowl, wherein, in the advanced position, the deflectors are around the fan casing and wherein, in the retracted position, the deflectors are disposed across the opening, and
 a fan ramp having a mounting base and flaps, wherein the mounting base is formed as a ring fastened to a rear of the fan casing, and wherein each flap has a downstream edge and an upstream edge opposite the downstream edge,
 wherein each flap is able to rotate on the mounting base between a stowed position in which the upstream edge then projects towards the front of the nacelle and a deployed position in which the upstream edge then projects towards the outside of the nacelle through the opening and upstream of the deflectors in the retracted position,
 wherein, for each flap, the fan ramp has a return element that urges the flap into the deployed position, and wherein, for each flap, the deflectors have a stop that comes into contact with the rear of said flap when the mobile cowl passes from the retracted position to the advanced position.

2. The nacelle according to claim 1, wherein each flap is fastened to the mounting base by way of two articulations.

3. The nacelle according to claim 2, wherein each articulation is made up of a clevis secured to the flap, a tang secured to the mounting base and a pin passing through the clevis and the tang.

4. The nacelle according to claim 3, wherein each return element is a torsion spring fitted onto the pin, of which one end is urged against the flap and of which another end is urged against the mounting base.

5. An aircraft having an engine and a nacelle according to claim 1, wherein the engine is surrounded by the nacelle.

* * * * *